Feb. 22, 1955   K. MORITZ ET AL   2,702,565
SCREWED PLUG FOR CLOSING PIPE ENDS
Filed Nov. 28, 1952
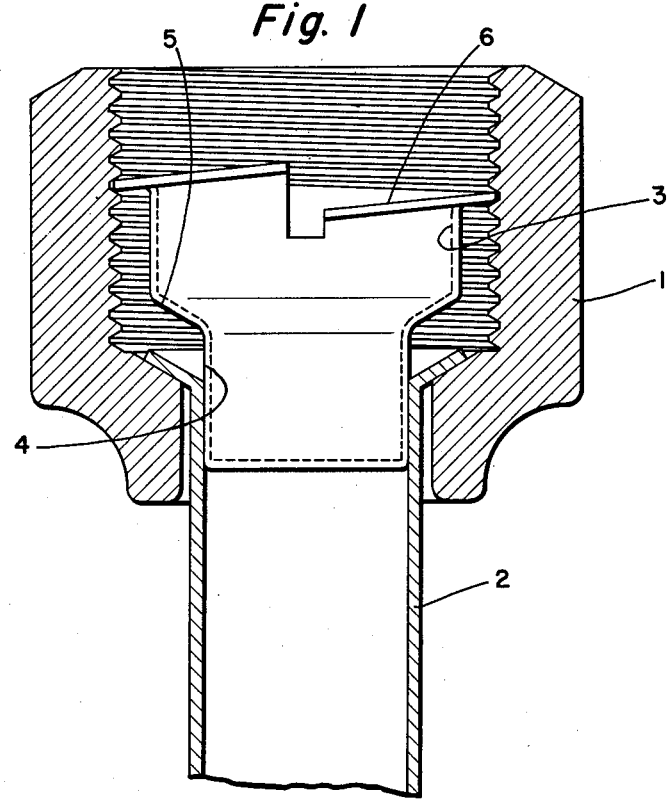
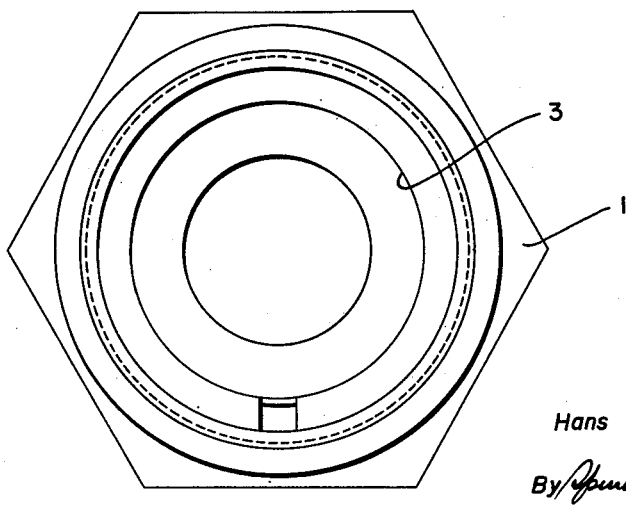
INVENTOR.
Kurt Moritz
Hans Ferdinand Wagner

United States Patent Office 2,702,565
Patented Feb. 22, 1955

2,702,565

SCREWED PLUG FOR CLOSING PIPE ENDS

Kurt Moritz and Hans Ferdinand Wagner, Russelsheim am Main, Germany, assignors to General Motors Corporation, Detroit, Mich., a corporation of Delaware Application November 28, 1952, Serial No. 322,900

Claims priority, application Germany December 4, 1951

5 Claims. (Cl. 138—89)

The present invention relates to screwed plugs such as are used for temporarily sealing off the ends of pipes which are subsequently connected up by union nuts.

Such pipe ends or the union-nut connections must be sealed against the penetration of dust and dirt or moisture during transit of these components, as when they are used in machines for refrigeration.

Plugs heretofore used for this purpose have been machined from solid brass or hexagon steel. As they are generally thrown away after use, solid plugs entail considerable extra cost, and unnecessarily increase weight during transit.

An object of the invention is to produce a simple and inexpensive plug which can easily be put in place and gives an efficient and tight sealing.

A plug according to the invention is formed as a hollow sheet metal structure without any machining; and comprises a conical stopper part closed at one end, an intermediate part forming a conical sealing face and a rim part adapted to be screwed into the internal thread of the union nut surrounding the pipe.

The manufacturing costs of such a plug are relatively low and the sealing is efficient and reliable; manipulation is simple and convenient, and the plug does not bulge, since it is drawn completely into the nut. It is light in weight and, on account of its cheapness, can be thrown away after use.

A preferred embodiment of the invention is shown in the accompanying drawings, in which:

Figure 1 is a section in elevation of a pipe and union nut connection with a plug embodying the invention partly inserted therein; and Figure 2 a plan, of the same embodiment, in the direction of the arrow.

In Figure 1 is shown a union-nut 1 which has a conical inner seating for the conically expanded pipe end 2. The pipe end 2 is hermetically sealed by a plug 3 made of sheet metal, and consisting of a conical stopper part 4 closed at one end and adjoined by an intermediate part 5 the conical sealing face of which is adapted to fit onto the internal flared seating of the pipe end and ends in a rim 6 which is shaped so as to fit into the internal thread of the nut.

The plug 3 is a hollow element formed from thin sheet metal; and the stopper part 4 is tapered or made slightly conical so that it fixes itself in the end of the pipe when inserted.

The union nut 1 can be screwed on to the top rim 6 of the plug, the latter being held by the insertion of a finger, if necessary. By rotating the union nut 1, the plug 3 is drawn into the pipe beyond the position shown in the drawing so that the stopper part 4 forced into the pipe and the intermediate part 5 is pressed on to the internal flared pipe seating thereby producing an hermetic seal of either the conical stopper part 4 or of the intermediate part 5 or of both with the pipe.

The pitch of the rim 6 of the plug 3 matches the thread of the particular union-nut employed and has a self-arresting action if the plug is correctly manipulated.

The plug is removed by reverse rotation of the nut 1 and, if necessary, it is again prevented from turning by holding with a finger.

Thet manufacturing costs of the screwed plug are very small since, because of the small amount of material involved, even scrap metal can be used for its manufacture.

We claim:

1. A plug for sealing the end of a pipe carrying an internally threaded union nut, the plug being hollow and formed from sheet metal and having at least one conical sealing surface and an outwardly flanged rim adapted to seat in a thread of the nut so arranged that rotation of the nut in one direction causes the plug to seat in the pipe end, the conical sealing surface forming a hermetic seal with part of the pipe.

2. A hollow plug for sealing one end of a pipe on which there is an internally threaded union nut said plug being closed at one end and comprising a tapered stopper part, an intermediate part having a conical sealing face and a rim part adapted to be screwed into the thread of the nut, so that on rotation of the nut the plug is pushed into and seals the end of the pipe.

3. A plug, for temporarily sealing one end of a refrigerator pipe connection on which is a union nut, the plug being formed from sheet metal and having a tapered stopper part, an adjoining conical sealing part and a rim which is shaped to fit into an internal thread in the nut so that rotation of the nut in one direction pushes the plug into the end of the pipe thereby causing sealing.

4. A plug seal adapted for the closure of the flared end of a pipe fitted with an internally threaded union, comprising a hollow member which is closed at one end and which at that end has a cylindrical slightly tapered portion adapted to fit into the end of the pipe, said member being open at the other end and formed with an external flange adapted to engage the threads of said threaded union, and conical portion on said member intermediate its ends adapted to seat on the flared portion of the end of said pipe.

5. A plug seal adapted for the closure of the flared end of a pipe fitted with an internally threaded union, comprising a hollow sheet metal member which is closed at one end and which at that end has a cylindrical slightly tapered portion adapted to fit into the end of the pipe, said member being open at the other end and formed with an external flange adapted to engage the threads of said threaded union, and conical portion on said member intermediate its ends adapted to seat on the flared portion of the end of said pipe.

References Cited in the file of this patent

UNITED STATES PATENTS

| Number | Name | Date |
|---|---|---|
| 1,247,391 | Gill | Nov. 20, 1917 |
| 1,297,403 | Rydquist | Mar. 18, 1919 |
| 1,860,886 | Brownstein | Mar. 31, 1932 |
| 2,040,383 | Jasper | May 12, 1936 |
| 2,130,496 | Hopkins | Sept. 30, 1938 |
| 2,416,826 | Hartley | Mar. 4, 1947 |
| 2,454,555 | Henderson et al. | Nov. 23, 1948 |

FOREIGN PATENTS

| 468,975 | Canada | Oct. 24, 1950 |